(12) United States Patent
Delgado

(10) Patent No.: US 9,004,774 B1
(45) Date of Patent: Apr. 14, 2015

(54) BALL BEARING SYSTEM FOR INTERNAL COMBUSTION ENGINE TURBOCHARGERS

(71) Applicant: Joseph S. Delgado, San Dimas, CA (US)

(72) Inventor: Joseph S. Delgado, San Dimas, CA (US)

( * ) Notice: Subject to any disclaimer, the term of this patent is extended or adjusted under 35 U.S.C. 154(b) by 0 days.

(21) Appl. No.: 14/247,877

(22) Filed: Apr. 8, 2014

(51) Int. Cl.
F16C 27/00 (2006.01)
F01D 25/16 (2006.01)
F04D 29/056 (2006.01)

(52) U.S. Cl.
CPC .................................. F04D 29/0563 (2013.01)

(58) Field of Classification Search
CPC ................. F16C 19/18; F16C 19/181–19/187; F16C 27/066; F16C 2360/24; F01D 25/28; F01D 25/162
USPC ......... 384/473, 474, 475, 477, 504, 512, 517, 384/535, 536, 489, 581, 582; 415/111–113, 415/229
See application file for complete search history.

(56) References Cited

U.S. PATENT DOCUMENTS

| | | | | |
|---|---|---|---|---|
| 3,897,985 A * | 8/1975 | Davis et al. | ................... | 384/495 |
| 4,329,000 A * | 5/1982 | Keske | ............................ | 384/464 |
| 4,547,083 A * | 10/1985 | Horler | ............................ | 384/535 |
| 4,708,602 A * | 11/1987 | McEachern et al. | .......... | 417/407 |
| 6,425,743 B1 * | 7/2002 | Fischer | .......................... | 417/407 |
| 7,025,579 B2 * | 4/2006 | Woollenweber et al. | ..... | 417/407 |
| 8,784,036 B2 * | 7/2014 | Woollenweber | .............. | 415/112 |
| 2007/0110351 A1 * | 5/2007 | Larue | ............................ | 384/535 |

* cited by examiner

Primary Examiner — Phillip A Johnson
(74) Attorney, Agent, or Firm — Plager Schack LLP

(57) ABSTRACT

A ball bearing system for use with engine turbochargers dampens axial and radial thrust loads of a turbocharger and enhances performance and longevity. The system includes a bearing carrier with an aperture to house a shaft having a compressor wheel affixed to a first end of the shaft and a turbine wheel affixed to a second end of the shaft, the bearing carrier being able to house a plurality of bearings in contact with the shaft, an outer housing member connected to the shaft to enclose the bearing carrier, and a first O-ring and a second O-ring both disposed within grooves around the outer surface area of the bearing carrier, each O-ring also in contact with a corresponding groove in the interior of the outer housing member. The O-rings dampen the axial and radial loads of the rotating shaft of the turbocharger.

8 Claims, 2 Drawing Sheets

BALL BEARING SYSTEM FOR INTERNAL COMBUSTION ENGINE TURBOCHARGERS

BACKGROUND

The embodiments herein relate generally to internal combustion engine turbochargers. More specifically, embodiments of the invention relate to ball bearing systems for use with turbochargers.

Turbochargers are utilized in both diesel and gas engines to increase the power output by using exhaust gases of the engine to rotate a turbine wheel, which rotates a compressor wheel connected to the turbine wheel via a shaft. The rotation of the compressor wheel generates compressed air, which is forced back into the engine's combustion chamber to create more robust explosions, thereby enhancing the power output of the engine.

Several turbochargers use ball bearing components to enhance mechanical efficiency and therefore improved turbo performance. In particular, ball bearing components provide less friction, which results in faster acceleration and increases the fuel efficiency of the internal combustion engine compared to conventional sleeve turbochargers. Ball bearing turbochargers may comprise either oil lubricated systems or oil-less systems that use grease as an alternative lubricant. Current ball bearing turbochargers are limited because they do not effectively dampen the axial and radial loads resulting from the high speed rotations of the shaft. This causes the components to wear quickly and reduces the performance and longevity of the turbocharger. In addition, oil lubricated ball bearing turbochargers are disadvantageous because they are prone to oil leaks. This renders the turbocharger ineffective and/or impractical.

As such, there is a need in the industry for a ball bearing system for turbochargers that effectively dampens the axial and radial thrust loads of the rotating shaft. This enhances the performance, efficiency and longevity of the turbocharger. There is a further need for a ball bearing system for turbochargers that minimizes oil leaks in oil lubricated systems.

SUMMARY

A ball bearing system for use with high speed engine turbochargers is provided. The ball bearing system is configured to dampen axial and radial thrust loads of a turbocharger and enhance performance and longevity of the turbocharger. The ball bearing system comprises a bearing carrier comprising an aperture configured to house a shaft comprising a compressor wheel affixed to a first end of the shaft and a turbine wheel affixed to a second end of the shaft, the bearing carrier further being configured to house a plurality of bearings in contact with the shaft to allow a rotation of the shaft, an outer housing member operably connected to the shaft and configured to enclose the bearing carrier, and a first O-ring and a second O-ring both disposed within grooves around the outer surface area of the bearing carrier, each O-ring also in contact with a corresponding groove in the interior of the outer housing member, wherein the O-rings are configured to dampen the axial and radial thrust loads of the rotating shaft of the turbocharger. O-rings on the bearing carrier will also prevent wear and cushion against shock and vibration.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figure 1:
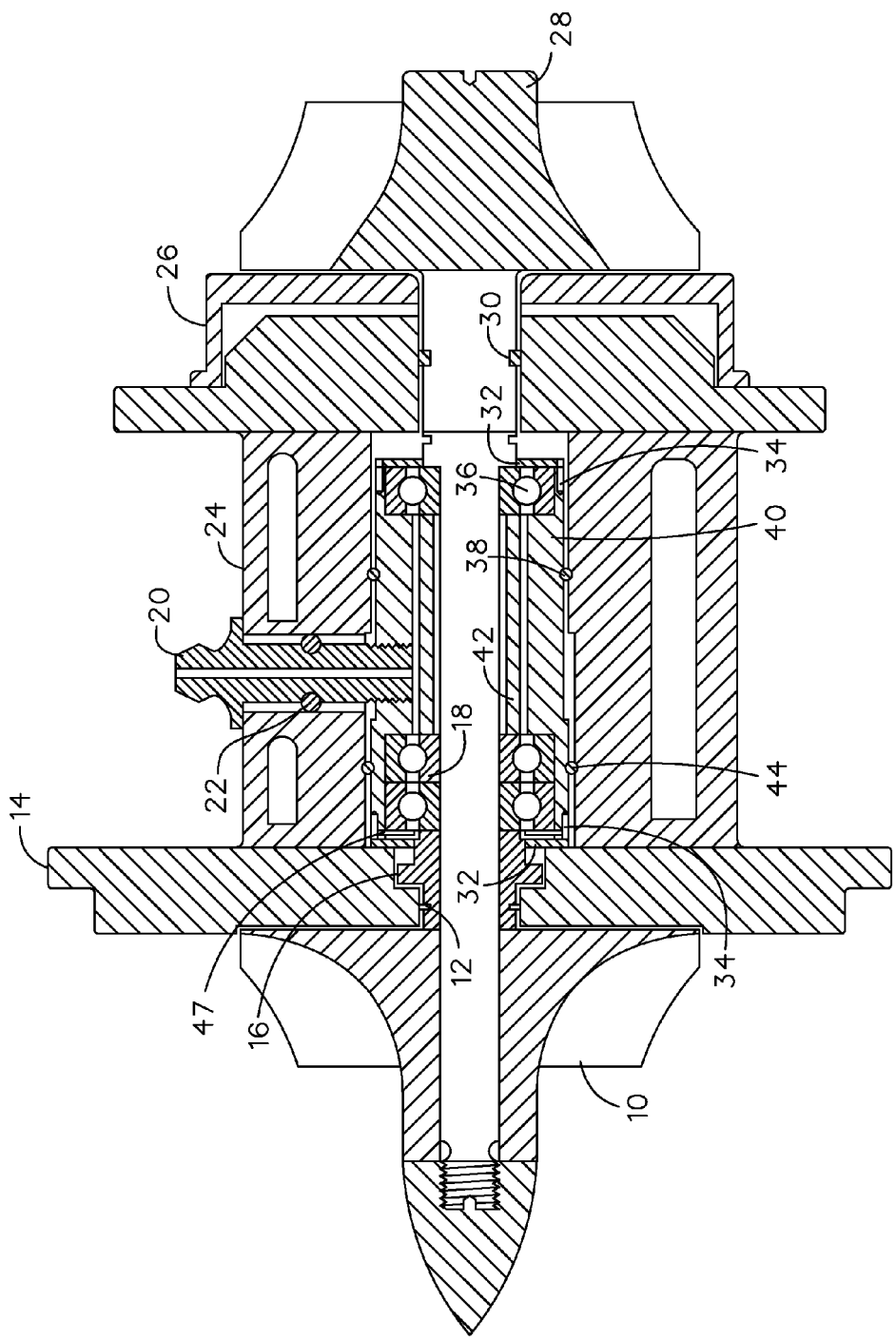
FIG. 1 depicts a section view of certain embodiments of the ball bearing system for a turbocharger that is oil-less.

As depicted in FIG. 1, an oil-less ball bearing system for use with turbochargers is shown in detail. An oil-less ball bearing system is a system that does not require engine oil to lubricate and cool the components of the turbocharger such as the ball bearings. Instead, these systems utilize high speed bearing grease to lubricate the bearings. The oil-less ball bearing system comprises compressor wheel 10, piston ring 12, seal plate 14, oil slinger 16, grease fitting 20, bearing housing 24, stepped bearing carrier 40, piston ring 30, heat shroud 26 and turbine wheel 28.

Compressor wheel 10 is connected to turbine wheel 28 by a shaft, which is housed within stepped bearing carrier 40. The shaft is rotatably mounted to the interior cavity of stepped bearing carrier 40 by dual row angular contact bearing 18 and single row angular contact bearing 36. These contact bearings remain in contact with the shaft and allow compressor wheel 10 and turbine wheel 28 to rotate. Dual row angular contact bearing 18 and single row angular contact bearing 36 comprise ceramic balls and inner and outer races both made from steel. Bearing spacer 42 is secured within stepped bearing carrier 40 to keep the inner races of dual row angular contact bearing 18 and single row angular contact bearing 36 in place. In addition, internal retaining ring 47 secures dual row angular contact bearing 18 in place and prevents them from moving in the presence of thrust loads from the turbocharger. This allows the bearings to operate properly. Bearing carrier caps 32 are affixed to opposing ends of stepped bearing carrier 40 by any fastening means known in the field such as a threaded screw-type mechanism. One or more flat head cap screws 34 may be used. Bearing carrier caps 32 seal stepped bearing carrier 40 and prevent any grease or oil stored within the stepped carrier from leaking out. Oil slinger 16 is connected to grooves within bearing carrier cap 32, which further prevents grease or oil from leaking out of stepped carrier 40. Oil slinger 16 is also connected to the inner race of dual row angular contact bearing 18.

Bearing housing 24 is connected to seal plate 14 and encloses stepped bearing carrier 40. Bearing housing 24 may have a water cavity for cooling the turbocharger. Bearing housing 24 further comprises grease fitting 20, which is a tubular member that extends into stepped bearing carrier 40. This allows a user to inject high-speed bearing grease into grease fitting 20. The grease travels through grease fitting 20 and into the interior cavity of stepped bearing carrier 40. This allows the grease to lubricate dual row angular contact bearing 18 and single row angular contact bearing 36. This prevents the bearings from overheating when the compressor wheel and turbine wheel shaft rotates. In addition, the life span of the turbocharger is increased because the ball bearings may be regreased as needed via grease fitting 20. This eliminates the disassembly of the turbocharger to repack and/or service the bearings.

The outer surface of grease fitting 20 comprises a groove to house O-ring 22. O-ring 22 is configured to dampen the axial thrust loads of the rotating turbocharger shaft. Similarly, the outer surface area of stepped bearing carrier 40 has a pair of grooves configured to receive O-ring 44 and O-ring 38.

O-ring 44 and O-ring 38 are also disposed within corresponding grooves in the interior of bearing housing 24. As such, O-ring 44 and O-ring 38 remain in contact with both bearing housing 24 and stepped bearing carrier 40. O-ring 44 and O-ring 38 are configured to dampen both the axial thrust loads and radial thrust loads of the rotating turbocharger shaft. O-ring 22, O-ring 44 and O-ring 38 may have any dimensions and be made from any materials including but not limited to silicone or fluoroelastomers such as VITON. In a preferred embodiment, O-ring 44 has larger dimensions than O-ring 22 and O-ring 38. It shall be appreciated that the diameter of stepped bearing carrier 40 decreases from the dual row angular contact bearing 18 side to the single row angular contact bearing 36 side of the carrier. The decreased diameter of stepped bearing carrier 40 on one side provides additional space between bearing housing 24 and stepped bearing carrier 40 to house O-ring 38. This is advantageous because the additional space prevents O-ring 38 from tearing when stepped bearing carrier 40 is assembled within bearing housing 24.

Figure 2:
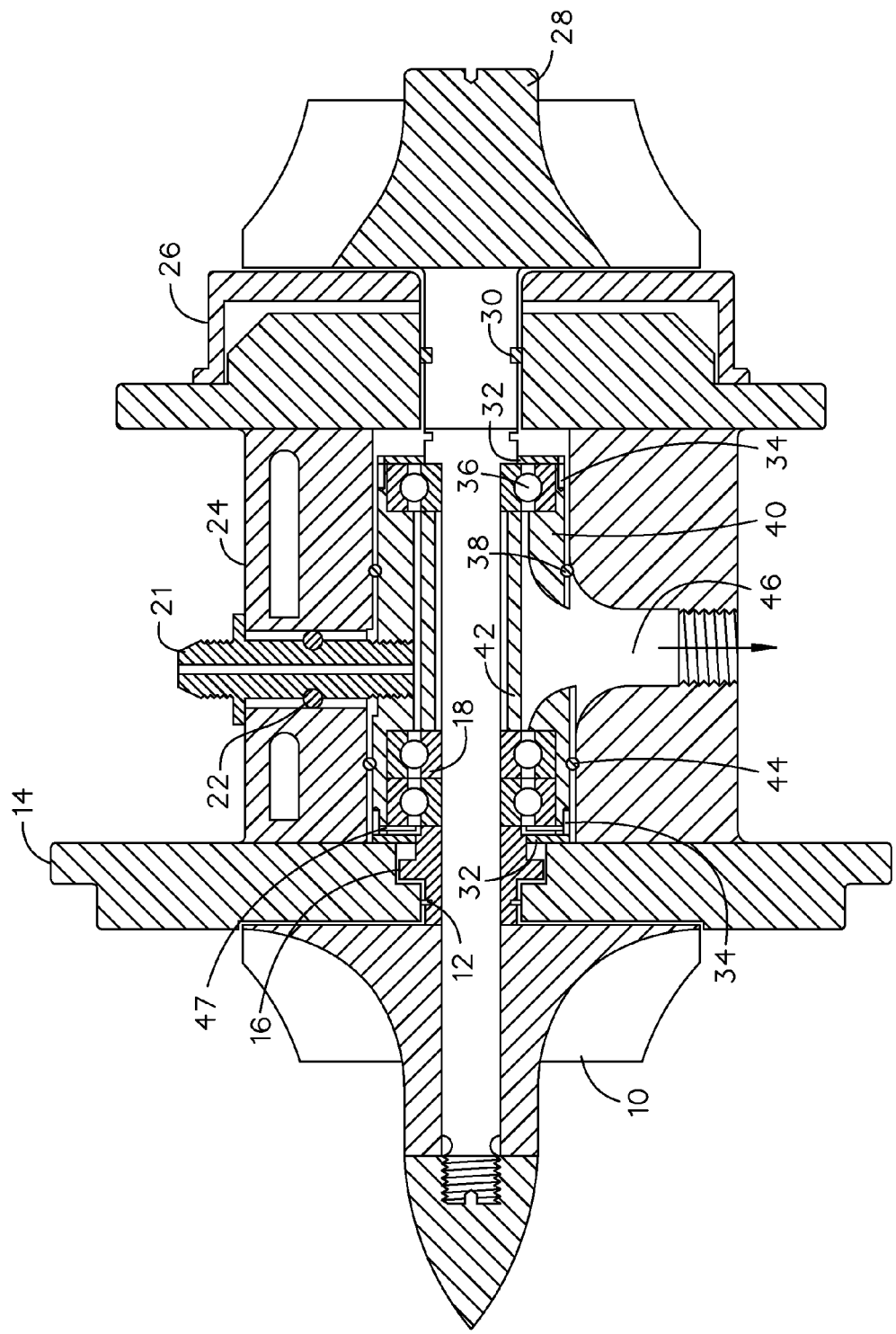
FIG. 2 depicts a section view of certain embodiments of the ball bearing system for a turbocharger that is oil lubricated.

As depicted in FIG. 2, an oil lubricated ball bearing system for use with turbochargers is shown in detail. The majority of the components of the oil lubricated system remain the same as the oil-less ball bearing system described above with the following differences. Bearing housing 24 comprises oil fitting 21, which is a tubular member that extends into stepped bearing carrier 40. This allows oil from an internal combustion engine to be pumped into oil fitting 21. The engine oil travels through oil fitting 21 and into the interior cavity of stepped bearing carrier 40. This allows the engine oil to lubricate dual row angular contact bearing 18 and single row angular contact bearing 36, which prevents the bearings from overheating when the turbocharger shaft rotates. The oil lubricated ball bearing system further comprises oil drain passage 46 on the bottom of bearing housing 24. This allows engine oil from the interior cavity of stepped bearing carrier 40 to flow through oil drain passage 46 into a connected hose (not shown), which connects to a lubrication source such as an oil pan (not shown). Since stepped bearing carrier 40 is secured within bearing housing 24 by O-rings, engine oil is only required within the interior of stepped bearing carrier 40. This fact along with the use of carrier caps 32 prevent oil from leaking from the compressor side and turbine side piston rings 12 and 30.

In operation of the ball bearing system, the shaft connecting compressor wheel 10 and turbine wheel 28 rotates. O-ring 22 dampens the axial thrust loads of the rotating turbocharger shaft. O-ring 44 and O-ring 38 dampen both the axial thrust loads and radial thrust loads of the rotating turbocharger shaft. This allows the turbocharger to run smoothly and efficiently. Grease or oil contained within the cavity of stepped bearing carrier 40 is sealed by carrier caps 32 to prevent any leakage. Ultimately, the ball bearing system described herein enhances the performance and longevity of the turbocharger.

It shall be appreciated that the components of the ball bearing system described in several embodiments herein may comprise any known materials in the field and be of any color, size and/or dimensions. For example, many components of the system may be made from stainless steel, aluminum, or cast iron. It shall be appreciated that the components of the ball bearing system described herein may be manufactured and assembled using any known techniques in the field.

Persons of ordinary skill in the art may appreciate that numerous design configurations may be possible to the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A ball bearing system for use with high speed engine turbochargers, the ball bearing system being configured to dampen axial and radial thrust loads of a turbocharger and enhance performance and longevity of the turbocharger, the ball bearing system comprising:
    a bearing carrier comprising an aperture configured to house a shaft comprising a compressor wheel affixed to a first end of the shaft and a turbine wheel affixed to a second end of the shaft, the bearing carrier further being configured to house a plurality of bearings in contact with the shaft to allow a rotation of the shaft;
    an outer housing member operably connected to the shaft and configured to enclose the bearing carrier; and
    a first O-ring and a second O-ring both disposed within grooves around the outer surface area of the bearing carrier, each O-ring also in contact with a corresponding groove in the interior of the outer housing member, wherein the O-rings are configured to dampen the axial and radial loads of the rotating shaft of the turbocharger.

2. The ball bearing system of claim 1, further comprising a tubular member disposed within an aperture in the outer housing member and an aperture in the bearing carrier, wherein the tubular member is configured to allow grease or oil to travel through to the bearing carrier to lubricate the plurality of contact bearings.

3. The ball bearing system of claim 2, further comprising a third O-ring disposed within a groove around the outer surface area of the tubular member, the third O-ring being configured to dampen the axial loads of the rotating shaft of the turbocharger.

4. The ball bearing system of claim 3, further comprising a pair of caps affixed to opposing ends of the bearing carrier, wherein the caps are configured to seal the bearing carrier and prevent oil or grease from leaking from the bearing carrier.

5. The ball bearing system of claim 4, wherein the plurality of bearings comprises a dual row angular contact bearing and a single row angular contact bearing.

6. The ball bearing system of claim 5, wherein the outer housing member comprises an oil drain passage.

7. The ball bearing system of claim 5, wherein the bearing carrier comprises a first diameter on one end to house the dual row angular contact bearing that is larger than a second diameter of the bearing carrier that houses the single row angular contact bearing.

8. The ball bearing system of claim 7, wherein the first O-ring is disposed in grooves around the second diameter portion of the bearing carrier to prevent the first O-ring from tearing when the bearing carrier is assembled within the outer housing member.

\* \* \* \* \*